United States Patent Office 3,636,216
Patented Jan. 18, 1972

3,636,216
COCCIDIOSIS CONTROL WITH QUINALINOL DERIVATIVES
Robert R. Baron, Edward W. Berndt, Harold E. Van Essen, and Edwin L. Brunsting, Charles City, Iowa, assignors to Salsbury Laboratories
No Drawing. Filed Sept. 26, 1968, Ser. No. 763,018
Int. Cl. A61k 27/00
U.S. Cl. 424—258          5 Claims

ABSTRACT OF THE DISCLOSURE

Veterinary compositions for the prevention and control of poultry coccidiosis which comprises a solid or liquid ingestible carrier and dispersed therein compounds of the general configuration:

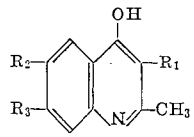

wherein $R_1$ is H or alkyl groups with 1 to 12 carbon atoms and $R_2$ and $R_3$ are H, OH, or alkoxy substituents with 1 to 12 carbon atoms and physiologically acceptable salts of such compounds. The compounds 3-n-heptyl-7-methoxy-2-methyl-4-quinolinol is described as an example.

---

This invention relates to prophylactic and curative compositions for and methods of treatment and control of poultry coccidiosis. Avian coccidiosis is a widely prevalent infection among chickens, turkeys, and other domesticated birds. It is caused by a genus of protozoal parasites known as Eimeria, among which *Eimeria tenella, Eimeria necatrix, Eimeria acervulina, Eimeria brunetti,* and *Eimeria maxima* are the most common species with varying degrees of harmfulness and virulence. While some etiological factors of this epizootic, such as *Eimeria tenella* and *Eimeria necatrix*, are especially destructive to the point of large scale mortality, the pathogenicity of others manifests itself primarily in a state of lingering morbidity, unthriftiness and progressive emaciation, exposing the afflicted flocks to numerous secondary bacterial and viral infections. Economic losses due to coccidiosis amount to many millions of dollars, which compels the poultry industry to seek new and improved means for controlling coccidial infections that have a broad spectrum of efficacy, do not adversely affect the normal physiological functions of the birds, and are economical in use.

We have found that chemical compounds having the aforesaid desirable properties are represented by the following configuration:

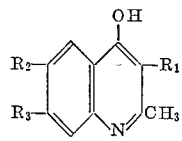

wherein $R_1$ is H or alkyl groups with 1 to 12 carbon atoms and $R_2$ and $R_3$ are H, OH, or alkoxy substituents with 1 to 12 carbon atoms. Physiologically acceptable salts of these compounds may likewise serve as active ingredients in our novel veterinary compositions.

Our invention will be illustrated by the compound 3-n-heptyl-7-methoxy-2-methyl-4-quinolinol, having the structure:

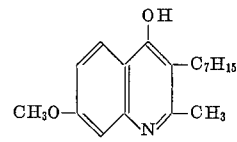

also known under the name of Endochin, and its hydrochloride salt. The chemical is obtained in form of white needles, has a melting point of 218.5–219.5° C. is soluble in alcohol and acetic acid and completely insoluble in water. Its synthesis from m-anisidine has been described by Nelson J. Leonard and co-workers in the J. Am. Chem. Soc., 68, 1279ff (July 1946).

In accordance with our invention the above-defined chemotherapeutic agents, in general, and Endochin and its hydrochloride, in particular, are advantageously employed by introducing the same into the animal organism in any form or manner in which they are apt to build up and maintain an effective blood and tissue level. This can be accomplished either by injection or by dispensation of suitable nontoxic dosage units in capsules or tablets. However, as a preferred embodiment of our invention the compounds are administered to the animals in combination with and dispersed in a solid, inert, and nontoxic vehicle in which they are uniformly and homogeneously dispersed. Inactive carriers of ingestible nature are any kind of vegetable food material such as ground corn, cornmeal, dried distillers grain, citrus meal, ordinary grain, mash, scratch, and any other normal or commercial rations. The so-medicated feed rations are placed before the birds for consumption ad libitum. The compounds may also be used as active ingredients in liquid compositions which can be conveniently prepared by means of drinking water, in which they are dissolved or suspended by the help of skim milk, edible oils, syrups, wetting agents, and emulsifiers.

The new drugs are principally, but not exclusively, intended for prophylactic purposes to prevent the eruption and spread of a latent infection, and to this effect are to be dispensed on a continuous schedule. When, for instance, an impending outbreak of coccidiosis in a natural flock is suspected by reason of exposure or the sporadic appearance of the first clinical symptoms of the disease, the remedies are administered to the birds for approximately two weeks and even for a longer period if the infection is of more serious nature.

The minimum dosage in the feed for protecting the birds from a coccidiogenic infection was established at 0.0125%, but this may be increased with superior results to the preferred concentration of 0.05%. These effective, but nontoxic, dosages may slightly vary depending upon the specific compound selected and the particular pathogenic Eimeria involved.

The utility of our new veterinary compositions will be illustrated by a number of tests against *Eimeria acervulina, Eimeria necatrix,* and *Eimeria brunetti*. The drug serving as a representative example was Endochin and its hydrochloric acid salt.

For each experiment, perfectly healthy 4½-week-old Leghorn chickens, in groups of 4, were reared in an aseptic environment and prepared for test fitness. Each bird was weighed starting on the first and continuing to the last day of the experiment. In order to determine the efficacy of the drug, each of the birds was placed on medicated food 2 days before artificial inoculation and successively maintained thereon for 8 to 13 days. For artificial challenges, the birds received, respectively, 5 to 10,000,000 oocysts of *Eimeria acervulina*, 200,000 oocysts of *Eimeria brunetti*, and 100,000 oocysts of *Eimeria necatrix*. A reference group of 4 birds was infected but left without medication and served as controls. A third group of 4 birds was neither challenged nor treated with medicated rations. The activity of the drugs was evaluated in terms of comparative fecal scores and morbidity factors, and in the case of *Eimeria necatrix*, of mortality rates.

Beginning on the fourth day after experimental inoculation and every day thereafter until the conclusion of the experiment, the droppings of each bird were carefully examined and their deviations from the normal appearance were graded in accordance with accepted practice as fecal scores, which were computed in the following manner. In the case of *Eimeria necatrix*, which produces hemorrhage, the amount of hemorrhage in the droppings collected in metal pans beneath the birds were rated and recorded in terms of:

0—no hemorrhage
B—slight hemorrhage
BB—moderate hemorrhage
BBB—severe hemorrhage
BBBB—very severe hemorrhage Upon the conclusion of the test, the maximum hemorrhage rating for each bird, irrespective of the day of its occurrence, was recorded. All the maximum ratings for the medicated, infected groups were totaled and compared with the total of the maximum ratings of the nonmedicated, infected controls. If the artificial infections had taken effective hold, each of the 4 infected and nonmedicated birds would show a full rating of BBBB during at least one day of the test period so that the maximum total rating for that group would usually amount to 16 B's. Supposing the highest ratings for four infected and medicated birds in a given group are, respectively, 0, BB, B, and B, the total rating for the entire group would be 4 B's. The difference between the B-totals divided by the maximum rating established for the infected, nonmedicated controls times 100 represents the "fecal score," thus $$16 - 4 = 12;\ \frac{12}{16} \times 100 = 75\%$$

A fecal score of 75%, therefore, means that the droppings were 75% normal.

In a similar manner, the fecal scores for the species causing no appreciable hemorrhage, but other characteristic clinical deviations in the droppings, are computed on the basis of their magnitude and conformity with the following ratings:

0—droppings normal
+—droppings slightly abnormal
++—droppings about half normal
+++—droppings about one-quarter normal
++++—droppings completely abnormal The morbidity factor expresses the comparative values between weight gains of medicated, infected birds on the one hand and nonmedicated, noninfected controls on the other and, further, a comparison between weight gains of medicated, infected birds and infected, nonmedicated birds or controls. During the interval between the 5th and 7th day the coccidial infection ordinarily causes the maximum inhibition of growth, which reflects itself in the ultimate weight gains or losses at the conclusion of the test period. Assuming the mean weight increase of the infected, medicated group in a given experiment is 68 gms., while that of the noninfected, nonmedicated birds is 129 gms., the ratio of $$\frac{68}{129} \times 100 = 53\%$$

would present the morbidity factor and indicate that the test birds had a growth rate drop of $100 - 53\% = 47\%$. If, on the other hand, the morbidity factor of the infected but nonmedicated controls is 5, the growth rate drop for that group would be $100 - 5\% = 95\%$. The difference between the two growth rate drops would be $95 - 47\% = 48\%$, and reflects the fact that the stunting effect of the infection was compensated by the drug to the extent of 48%.

In the following table the column indicating the test number is followed by the name of the compound under investigation and thereupon by the specific coccidiogenic organism which was tested and the concentration of the drug in the feed. Under the heading "Schedule" the first figure in the abbreviated term designates the number of feed medication days prior to the infection, and the second, in parenthesis, the total number of medication days. Thus, for instance, 2-IF(13) means that the birds were placed on the medicated diet two days prior to artificial inoculation and that the drug was given for a total of 13 days, or 11 additional days subsequent to the challenge.

The next columns list the fecal scores and the average weight gains in grams. They are followed by the morbidity factor (MF%), the growth rate drop (GRD%), and finally the compensating effect (CE%), as previously explained. The final two columns are specifically set up for *Eimeria necatrix*, which causes an appreciable rate of mortality. The first records the actual number of birds which have succumbed to the disease and the second translates these figures into percentages.

TABLE

| Test No. | Compound | Parasite | Feed conc., percent | Schedule | Fecal score | Av. wt. gains, gms | MF, percent | GRD, percent | CE, percent | Mortality, No. of dead | Percent |
|---|---|---|---|---|---|---|---|---|---|---|---|
| 1 | | Uninfected | | | 100 | 182 | 100 | | | | |
| 2 | | E. acervulina | | | 0 | 36 | 20 | 80 | | | |
| 3 | Endochin | | 0.0125 | 2-IF(13) | 0 | 57 | 31 | 69 | 11 | | |
| 4 | Endochin.HCl | | 0.0125 | 2-IF(13) | 0 | 43 | 24 | 76 | 4 | | |
| 5 | Endochin | | 0.0250 | 2-IF(13) | 45 | 68 | 37 | 63 | 17 | | |
| 6 | Endochin.HCl | | 0.0250 | 2-IF(13) | 20 | 59 | 32 | 68 | 12 | | |
| 7 | | Uninfected | | | 100 | 129 | 100 | | | | |
| 8 | | E. acervulina | | | 0 | 7 | 5 | 95 | | | |
| 9 | Endochin | | 0.0500 | 2-IF(8) | 80 | 68 | 53 | 47 | 48 | | |
| 10 | | Uninfected | | | 100 | 175 | 100 | | | | |
| 11 | | E. necatrix | | | 0 | 16 | 9 | 91 | | 3 | 75 |
| 12 | Endochin | | 0.0250 | 2-IF(13) | 50 | 106 | 61 | 39 | 52 | 0 | 0 |
| 13 | Endochin.HCl | | 0.0250 | 2-IF(13) | 75 | 180 | 103 | 0 | 91 | 1 | 25 |
| 14 | | Uninfected | | | 100 | 136 | 100 | | | | |
| 15 | | E. necatrix | | | 0 | | | | | 4 | 100 |
| 16 | Endochin | | 0.0500 | 2-IF(9) | 100 | 118 | 87 | 13 | | 0 | 0 |
| 17 | | Uninfected | | | 100 | 150 | 100 | | | | |
| 18 | | E. brunetti | | | 0 | 17 | 11 | 89 | | | |
| 19 | Endochin | | 0.0500 | 2-IF(11) | 100 | 115 | 77 | 23 | 66 | | |

As can be seen from the foregoing table, Endochin and its hydrochloride salt are potent remedies in the control of a variety of coccidiogenic organisms at the indicated dosage levels. In Experiment 5, for instance, the fecal score is improved by almost 50% over that of the infected controls, while the compensating effect on the drug checks the growth rate drop by 17% in an *Eimeria acervulina* infection. As shown in Experiment 13, Endochin hydrochloride controls *Eimeria necatrix* in terms of a fecal score of 75%, and not only completely prevents the total growth rate drop of the infection, which is 91%, but even overcompensates the rate to an extent of 3%, which is actually an indication of growth promotion activity despite the disease. The tests on *Eimeria necatrix* further show that the mortality rates at the level of 0.025% and 0.05% are 0, which means that the drugs afford 100% protection against death losses. Specifically, in Experiment 16, no growth rate drop and compensating effect could be computed, as all the infected controls had died prior to the completion of the experiment.

The preparation of the medicated feed compositions was carried out by intimately mixing the active ingredients with an orally ingestible carrier material such as feed in an amount of 20–50% by weight and introducing a proportionate quantity of this premix into the bulk of a commercial feed ration with thorough stirring and shuffling until a uniform blend of even distribution at the desired concentration between approximately 0.0125 and 0.05% was obtained. Commercial feed rations of the type employed in our experiments included the normal constituents in a mash or scratch supplemented with desirable amounts of vitamins, trace minerals, antibiotics, growth stimulants, and preservatives; the addition of which, however is optional.

To facilitate the handling of the small amounts of chemicals to be incorporated into the ultimate medicated ration, the premix can also be prepared by grinding a limited quantity of a nontoxic inert vehicle with an amount of up to 95% by weight of the drug. In this case, the carrier material may consist of fuller's earth, talcum, bentonite, ground oyster shells, limestone, and divers clays, or edible feed substances such as soybean meal, wheat middlings, and cornmeal and such stock concentrates are specifically made and adapted for use in dilutions with an edible carrier so as to compound the medicated rations at the desired dosage levels with utmost convenience. The availability of such concentrates is therefore highly desirable, if not indispensable, for the feed manufacturer and poultry raiser who ordinarily uses about one pound of the premix or concentrate for each ton of commercial feed to produce the finished medicated ration.

What we claim is:

1. A method for the control of coccidiosis in poultry comprising the step of orally administering to poultry an effective but nontoxic amount of 3-n-heptyl - 7 - methoxy-2-methyl - 4 - quinolinol or its physiologically acceptable salts.

2. A method for the control of coccidiosis in poultry which comprises adding to the feed ration of poultry, a quantity sufficient to provide 0.0125% to 0.05% by weight of 3-n-heptyl - 7 - methoxy - 2 - methyl-4-quinolinol or its physiologically accepted salts, and feeding the ration to poultry.

3. A method for the control of coccidiosis in poultry comprising the step of administering orally to poultry a composition consisting of a nontoxic orally ingestible carrier and 0.0125% to 0.05% by weight of 3-n-heptyl-7-methoxy - 2 - methyl - 4 - quinolinol or its physiologically accepted salts.

4. The method as defined in claim 3 wherein the nontoxic orally ingestible carrier is a poultry feed.

5. The method as defined in claim 3 wherein the nontoxic orally ingestible carrier is drinking water.

References Cited

UNITED STATES PATENTS 3,178,348   4/1965   Bickerton _ _ _ _ _ _ _ _ _ _ _ _ 424—258

OTHER REFERENCES

Salzer et al., Chem. Abst., vol. 43 (1949), p. 1415c.

SAM ROSEN, Primary Examiner